United States Patent

Walgren, Jr. et al.

(10) Patent No.: US 9,234,576 B2
(45) Date of Patent: Jan. 12, 2016

(54) INTEGRATED GEARBOX LUBE AND CONTROL SYSTEM

(71) Applicants: Timothy P. Walgren, Jr., Wales, WI (US); Dean A. Norem, Cherry Valley, IL (US); Charles L. DeGeorge, Suffield, CT (US); Alex Rak, Rolling Meadows, IL (US); Raymond N. Weyl, Rockford, IL (US); Ricky D. Reimers, Rockford, IL (US)

(72) Inventors: Timothy P. Walgren, Jr., Wales, WI (US); Dean A. Norem, Cherry Valley, IL (US); Charles L. DeGeorge, Suffield, CT (US); Alex Rak, Rolling Meadows, IL (US); Raymond N. Weyl, Rockford, IL (US); Ricky D. Reimers, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 297 days.

(21) Appl. No.: 13/711,137

(22) Filed: Dec. 11, 2012

(65) Prior Publication Data

US 2014/0157955 A1 Jun. 12, 2014

(51) Int. Cl.
*F16H 47/00* (2006.01)
*F16H 61/00* (2006.01)

(52) U.S. Cl.
CPC ....... *F16H 61/0021* (2013.01); *Y10T 74/19163* (2015.01)

(58) Field of Classification Search
USPC ................. 74/730.1, 731.1, 732.1, 733.1
See application file for complete search history.

(56) References Cited

U.S. PATENT DOCUMENTS

| 4,106,368 | A | * | 8/1978 | Ivey | 477/155 |
|---|---|---|---|---|---|
| 4,230,280 | A | * | 10/1980 | Leigh et al. | 239/677 |
| 5,988,335 | A | | 11/1999 | Kupferschmid et al. | |
| 6,644,429 | B2 | * | 11/2003 | Evans et al. | 180/307 |
| 6,984,171 | B2 | * | 1/2006 | Brome et al. | 460/59 |
| 7,134,980 | B2 | * | 11/2006 | Kroppe | 475/86 |
| 7,175,013 | B2 | * | 2/2007 | Burns et al. | 192/70.12 |
| 7,597,172 | B1 | * | 10/2009 | Kovach et al. | 180/305 |
| 7,798,272 | B2 | * | 9/2010 | Pruitt et al. | 180/197 |
| 2005/0167177 | A1 | * | 8/2005 | Roethler et al. | 180/305 |
| 2006/0254268 | A1 | * | 11/2006 | Yasuda et al. | 60/435 |

FOREIGN PATENT DOCUMENTS

| EP | 1614920 A1 | 1/2006 |
|---|---|---|
| EP | 2667053 A2 | 11/2013 |
| GB | 2491572 A | 12/2012 |
| WO | 2013065885 A1 | 5/2013 |

OTHER PUBLICATIONS

GB Office Action for corresponding GB Application No. GB1321689.0, dated Jun. 27, 2014, pp. 1-4.

* cited by examiner

*Primary Examiner* — Ha D Ho
(74) *Attorney, Agent, or Firm* — Cantor Colburn LLP

(57) ABSTRACT

A gearbox system includes a gearbox having integrated therein a pump system, a plurality of fluid passages and a clutch control system. The pump system is in fluid communication with the clutch control system via the fluid passages to flow at least one pressurized stream. A first pressurized stream controls a first pressure-responsive device included in the clutch control system. The gearbox system further includes a hydro-mechanical control unit (HMCU) in fluid communication with the gearbox to receive a second pressurized stream and to generate at least one actuator control stream. The actuator control stream controls an actuator integrated in the gearbox.

12 Claims, 3 Drawing Sheets

INTEGRATED GEARBOX LUBE AND CONTROL SYSTEM

BACKGROUND

A gearbox for an aircraft primarily functions to transmit rotational power through fixed engagements. A common gearbox lube system lubricates and removes heat, where lube oil is typically sourced from an external pumping system and is distributed within the gearbox. However, sometimes multiple functionalities are required that can be difficult to incorporate together and then package into the gearbox. These functionalities can include gearbox lubrication and cooling, a clutch to engage and disengage the gearbox, control of a propeller blade pitch system, and electrical systems with control and sensing capabilities.

Where higher capability and system functionality are necessary, a higher level of complexity and integration effort is required. In addition, a gearbox for an aircraft typically needs to operate at multiple altitudes. These altitudes usually require various aircraft angles and sometimes zero to negative G operation, especially for military aircraft. A typical gearbox is commonly designed with these multiple altitudes in mind. However, implementing multiple systems in a gearbox has been traditionally been challenging.

BRIEF DESCRIPTION OF THE DRAWINGS

The subject matter of the various embodiments is particularly pointed out and distinctly claimed in the claims at the conclusion of the specification. The foregoing and other features of the embodiments are apparent from the following detailed description taken in conjunction with the accompanying drawings in which:

DETAILED DESCRIPTION

Figure 1:
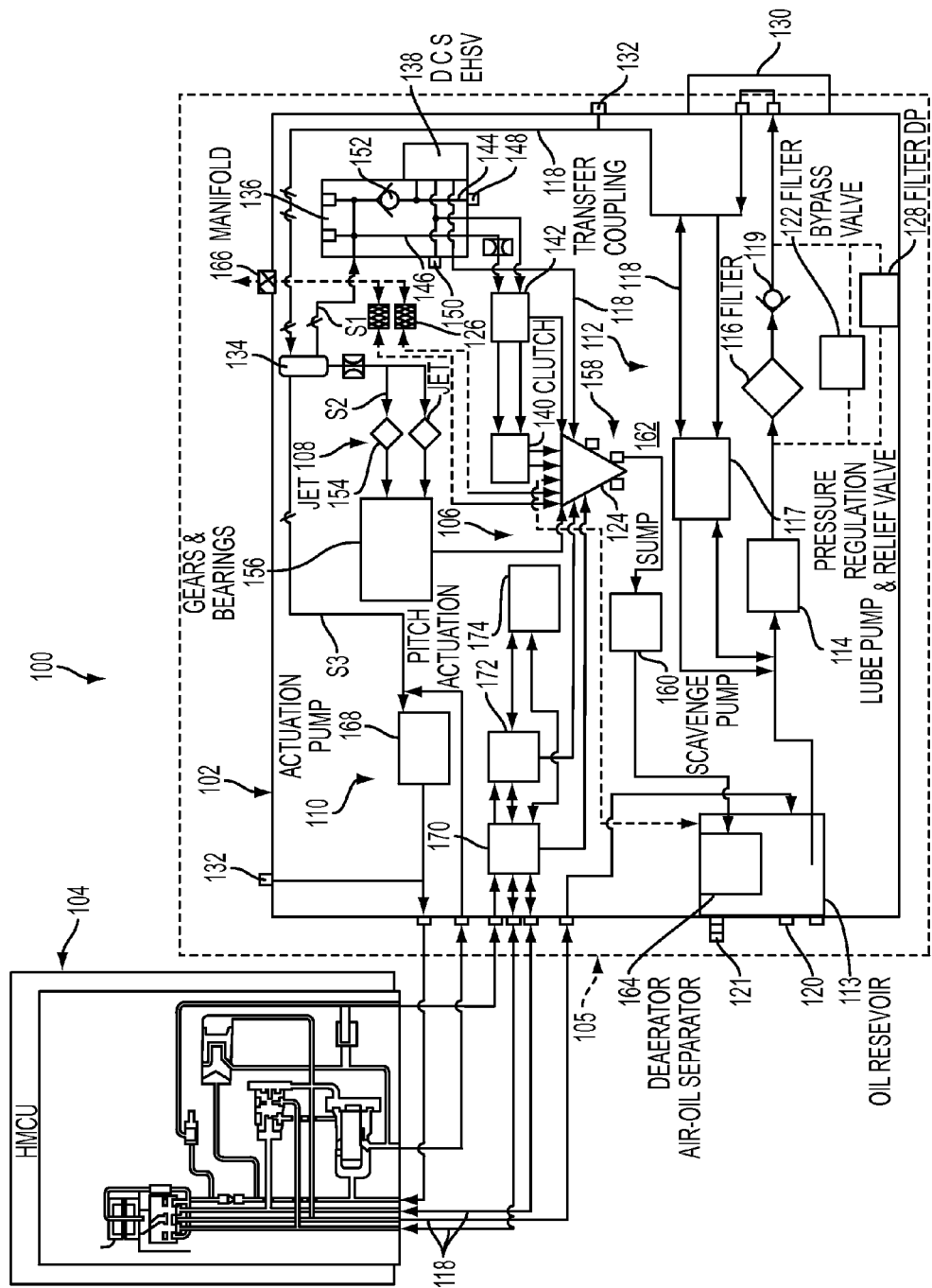
FIG. 1 is a schematic diagram of a gearbox hydraulic system according to an embodiment of the disclosure.

Referring now to FIG. 1, a gearbox system 100 is illustrated according to an embodiment. The gearbox system 100 may be utilized by an aircraft; however, the gearbox system 100 is not limited thereto and instead may be utilized in other various systems including, but not limited to, land-based vehicles and naval vessels.

According to an embodiment, the gearbox system 100 includes a gearbox 102 and a hydro-mechanical control unit (HMCU) 104. The gearbox 102 may transfer rotational power generated by a rotating input shaft (not shown) to rotationally drive a propulsion system, such as a propeller system (not shown) for example. One or more sub-systems may be integrated within the gearbox 102. In at least one embodiment, the gearbox 102 includes a housing 105 having one or more sub-systems disposed therein. The sub-systems may include, for example, a pressure-actuated hydraulic clutch that selectively engages and/or disengages the gearbox 102 from the input shaft, a hydraulic system to hold and change propeller blade pitch, a gear and bearing system, a three stage pumping system to provide hydraulic control, lubrication and cooling, a reservoir, a deaerator, an accumulator to maintain hydraulic clutch control during zero to negative G attitude operation, a propeller pitch-lock valve to hydraulically lock the propeller blade angle during zero to negative G attitude operation, and electrical systems to provide hydraulic control and sensing for pressure and temperature.

Referring further to FIG. 1, the gearbox 102 includes a clutch control system 106, a lubrication/cooling system 108, and an actuation system 110. The gearbox 102 further includes a pump system 112 integrated in the gearbox 102 that draws in fluid contained in a reservoir 113 and delivers it to the clutch system 106, the lubrication/cooling system 108, and the actuation system 110.

More specifically, the main stage pump system 112 comprises of a positive displacement lube pump 114, a system filter 116, a pressure regulating valve 117, and a plurality of fluid passages 118. The lube pump 114 draws solid fluid in from the reservoir 113 and flows it to the system filter 116 via one or more of fluid passages 118. In at least one embodiment a plurality of fluid passages 118 is integrated within the gearbox 102. A check valve 119 may be disposed downstream from the system filter 116 to prevent the solid fluid from flowing backwards during shutdown and/or filter maintenance. The interconnected fluid passages facilitate the interplay of all system elements, and may deliver flow having various pressures such as low-pressure, mid-pressure and high-pressure. For example, low-pressure fluid may have a pressure ranging from about 0 psi to about 300 PSI, mid-pressure fluid may have a pressure ranging from about 300 psi to about 600 psi, and high-pressure fluid may have a pressure of about 600 psi and above. The lube pump 114 is driven in response to rotational power generated by the rotating input shaft. The lube pump 114 generates a pressurized fluid flow of about 300 psi, for example. The reservoir 113 may include a temperature transducer 120 to monitor the fluid temperature therein, and one or more vents 121 to vent the reservoir 113 to atmospheric pressure. Further, the reservoir 113 may include various components to manage and/or service the oil volume therein including, but not limited to, fluid fill and spill ports, a fluid level sight glass, and a fluid drain plug.

The system filter 116 may include a filter bypass valve 122 that bypasses fluid if the system filter 116 becomes blocked. The bypassed fluid may be passed on to the gearbox. The sump 124 may be vented to atmospheric pressure through one or more screened vents 126. The system filter 116 also includes a filter delta pressure indicator (FDPI) 128. The FDPI 128 may include a pressure indicator that indicates the pressure across the filter element during various operations including, but not limited to, impending bypass and imminent filter maintenance or replacement.

After passing through the system filter 116, the fluid exits the gearbox 102 and goes through an external air/oil heat exchanger 130 that regulates, i.e., reduces, the temperature of the fluid. The regulated, i.e., cooler, fluid then re-enters the gearbox 102 and is received by the pressure regulating valve 117. The pressure regulating valve 117 regulates the flow and pressure of the conditioned fluid at the predetermined pressure. The pressure regulating valve 117 may also function as a relief valve, which bypasses all surplus fluid to the main stage pump inlet. One or more pressure transducers 132 may be in fluid communication with a respective fluid passage 118 to monitor fluid pressure. For example, a pressure transducer 132 is disposed downstream from the pressure regulating valve 117 to monitor the main stage fluid pressure as regulated by the pressure regulating valve 117. The regulated fluid from the pressure regulating valve 117 is directed to a flow divider 134 that is integral to the core passage system. The flow divider 134 is integrated in the gearbox 102, and divides the regulated fluid into three control streams (S1, S2, S3). In at least one embodiment, the flow divider 134 is formed integrally from an inner surface of the gearbox 102. The three control streams (S1, S2, S3) are directed to the clutch control system 106, the lubrication/cooling system 108, and the actuation system 110, respectively, to control various operations thereof as described in greater detail below. Accordingly, integrating the flow divider 134 in the gearbox 102 may achieve one or more control streams that conveniently allow for integrating one or more sub-systems, such as an actuation system, a pump system, etc., within the gearbox 102.

The clutch control system 106 comprises a manifold 136 and an electro-hydraulic servo valve (EHSV) 138. In at least one embodiment, the clutch control system is integrated in the gearbox 102. The manifold 136 receives the first stream (S1) from the flow divider 134, and generates cooling, lubrication, actuation flow, and pressure that are selectively output to a hydraulic clutch 140. Accordingly, the clutch 140 may be selectively engaged and disengaged as described further below. When the clutch 140 is engaged, the output shaft of the gearbox 102 becomes synchronized with the constantly rotating input shaft. When the clutch 140 is disengaged, the gearbox 102 is disconnected from the rotating shaft. The gearbox 102 may further include a clutch transfer coupling device 142 that allows external fluid to pass into and through the rotating input shaft.

The EHSV 138 is in electrical communication with the manifold 136 and a remotely located clutch control module (not shown). The clutch control module may output a control signal that indicates a desire to engage/disengage the clutch 140. The EHSV 138 receives the control signal from the clutch control module, and instructs the manifold 136 to engage/disengage the clutch 140. In the case where the clutch 140 is to be engaged, the EHSV 138 converts a clutch control signal and provides hydraulic pressure and flow to the manifold 136. Based on the control signal, the manifold 136 delivers the actuation flow, and pressure to engage and synchronize the clutch 140. If the clutch 140 is to be disengaged, the EHSV 136 terminates the clutch signal, which causes the manifold 136 to inhibit delivery of the actuation flow, and pressure. As the actuation flow and pressure decreases, the clutch 140 becomes disengaged. The coolant and lubrication flows are fed continuously regardless of the clutch status.

The clutch control system 106 may also include one or more sensors, which provide feedback information to the clutch control module. Based on the feedback information, the clutch control module may output additional control signals to the EHSV 138. It is appreciated that although the embodiment illustrated in FIG. 1 utilizes the manifold 136 and EHSV 138 to control operation of a clutch control system, the clutch control system may be replaced with another type of actuation system to be controlled using the manifold 136 and the EHSV 138.

In a case where the gearbox 102 is implemented in an aircraft system, the manifold 136 may further include two output ports 144, 146, that attach to an accumulator 148 and the pressure transducer 150, respectively, which monitor the fluid pressure. During zero to negative G attitude operation, the accumulator 148 discharges to continue hydraulic clutch operation. A check valve 152 may be provided in manifold 136 to prevent fluid from returning into the distribution system, and excessively reducing the pressure used for clutch actuation within the manifold 136.

The lubrication/cooling system 108 receives the second stream (S2) output from the flow divider 134. In at least one embodiment, the lubrication/cooling system 108 is integrated in the gearbox 102. The lubrication/cooling system 108 comprises one or more coolant components 154 including, but not limited to, jets and orifices that lubricate and cool one or more gearing/bearing systems 156 operating in the gearbox 102. For example, one gear/bearing system 156 may be associated with the clutch 140. Accordingly, the lubrication/cooling system 108 may deliver cooled lubricating fluid to the gear/bearing system 156 to prevent overheating.

The gearbox 102 may further include a debris filter system 158. The debris filter system 158 may include a positive displacement scavenge pump 160, a screened chip detector 162, and a deaerator 164. Leakage and drainage fluid from various portions of the gearbox system 100, such as the HMCU 104, clutch control system 106, manifold 136, gear/bearing systems 156, etc., may be collected in the sump 124. The positive displacement scavenge pump 160 may be driven by the rotating input shaft, and may flow fluid mixed with air from the sump 124 through the screened chip detector 162, which collects and monitors debris in the air/fluid mixture. The air/fluid mixture is then sent through the deaerator 164 that separates the air from the fluid. The separated air is directed back to the sump 124 and the solid fluid is directed into the reservoir 113 such that processes performed by the pumping system 112 may continue.

The actuation system 110 may be utilized to control and/or move various types of pressure-responsive devices. According to an embodiment illustrated in FIG. 1, the actuation system 110 is integrated in the gearbox 102, and may be utilized to control a pitch of a moveable propeller blade unit (not shown). Although one embodiment utilizes the actuation system 110 to control a pitch of a propeller blade unit, the actuation system is not limited thereto. The actuation system 110 further includes a positive displacement actuation pump 168, an actuator transfer coupling device 170, a propeller pitch-lock valve (PPLV) 172 and an actuator, e.g., a pitch actuator 174. Accordingly, the actuation system 110 works together with the HMCU 104 to control the pitch actuator 174 and adjust the pitch of the propeller blade unit. For example, the HMCU 104 receives an increased fluid pressure output from the actuation pump 168, which is driven by the rotating input shaft, and generates an actuator control stream that provides fluid pressure for controlling a movement of the pitch actuator 174. The actuation pump 168 may increase the fluid pressure of the third stream (S3), for example, from about 300 psi to about 600 psi or greater. As previously mentioned, although the actuator control stream is described above to control a pitch actuator 174, the actuator control stream may be utilized to control other types of actuators that control other types of mechanical components.

Figure 2:
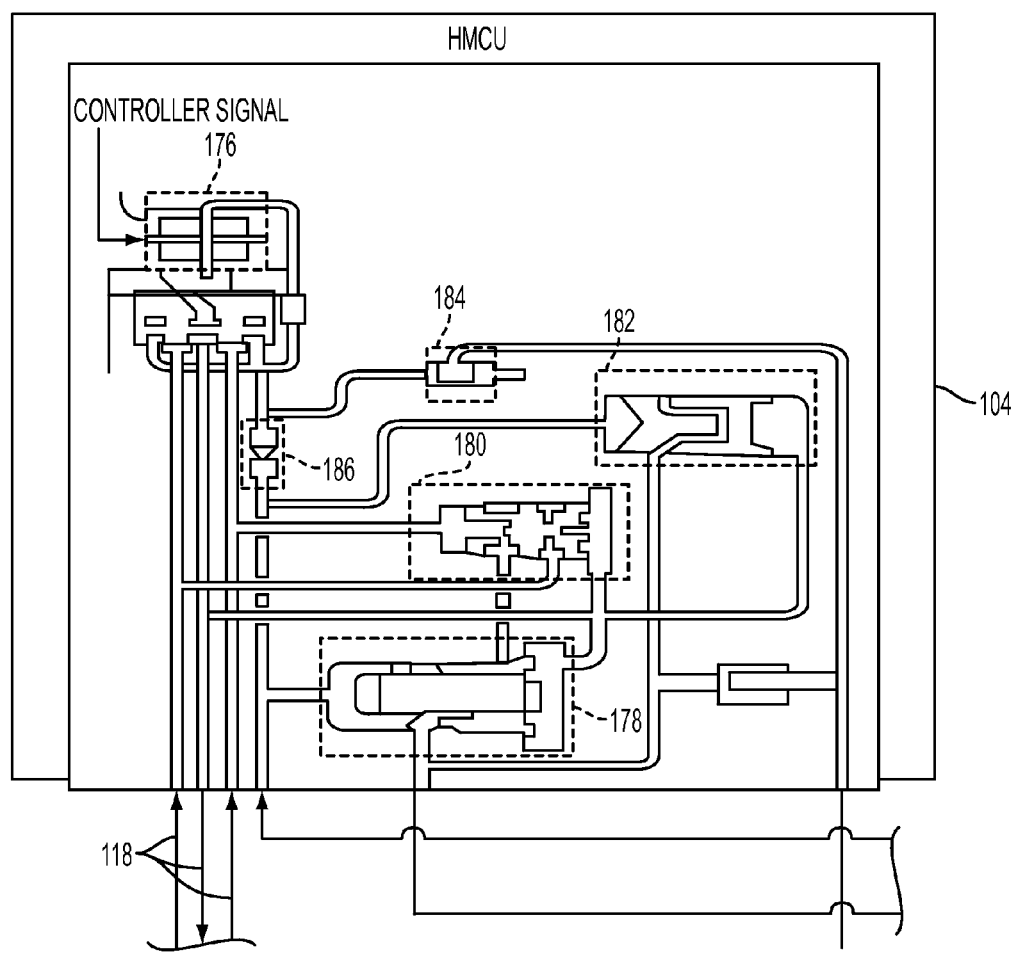
FIG. 2 is an enlarged view of a hydro-mechanical control unit included in the gearbox system illustrated in FIG. 1.

Referring now to FIG. 2, the HMCU 104 described above is illustrated in greater detail. The HMCU 104 may include a second electro-hydraulic servo valve (EHSV) 176, a pressure regulating valve 178, and a selector valve 180, which all work to provide flow and pressure to the actuation system 110 to control the pitch of propeller blade unit.

The second EHSV 176 may operate similar to the first EHSV 138 discussed above. More specifically, the second EHSV 176 may receive an electronic control signal from a main actuator control module (not shown) located remotely from the HMCU 104. The electronic control signal generated by the actuator control module may indicate a desire to adjust a mechanical component, such as the propeller blade unit, controlled by an actuator, such as the pitch actuator 174. In response to the control signal, the EHSV may control one or more valves, e.g., the pressure regulating value 178, the selector valve 180, etc., to output a fluid control signal, which controls one or more actuation systems 110. The actuation system 110 may also include one or more sensors, which provide feedback information to the main actuator control module. Based on the feedback information, the actuator control module may output additional electronic control signals to the EHSV 176.

The HMCU 104 may also include a pressure regulating valve 182. The pressure regulating valve 182 may also serve as a bypass, which returns surplus fluid to the reservoir 113. The actuator transfer coupling device 170 allows external fluid to pass into and through the propeller blade positioning actuator. During normal operation when the full supply pressure is present, the PPLV 172 allows actuation fluid to pass through to control the pitch angle of the propeller blade unit. However, when supply pressure is interrupted, as during zero to negative G altitude operation, the PPLV 172 hydraulically locks the propeller blade unit to hold at the last commanded angle set prior to experiencing the interruption.

In at least one embodiment, the HMCU 104 may be set to an atmospheric pressure through the reservoir, where leakage and actuation return flow is delivered. Further, the HMCU 104 may include two ground actuation check connections 184 and one or more check valves 186, which may be connected to an external control system (not shown) that may service the gearbox system 100. The check valves 186 may also be in fluid communication with the sump 124 to provide a separate drain path thereto.

Figure 3:
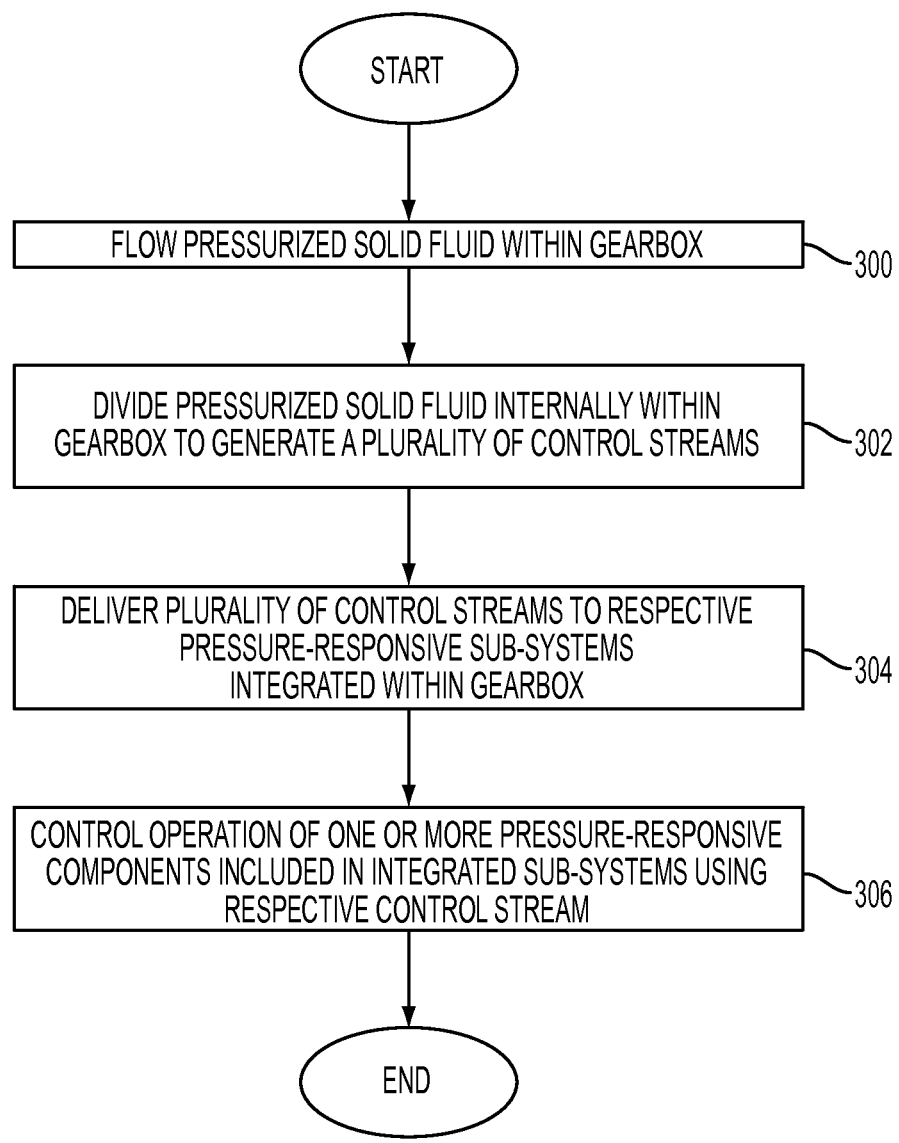
FIG. 3 is a flow diagram illustrating a method of controlling a gearbox hydraulic system according to an embodiment of the disclosure.

Referring now to FIG. 3, a flow diagram illustrates a method of controlling a gearbox hydraulic system according to an embodiment of the disclosure. At operation 300, a pressurized solid fluid is flowed within the gearbox, i.e., internally. As discussed above, the pressurized solid may be drawn from a reservoir and flowed internally throughout the gearbox using a main stage pump system. At operation 302, the pressurized solid fluid is divided into a plurality of control streams. In at least one embodiment discussed above, a flow divider is integrated inside the gearbox and divides the main pressurized solid flow delivered by the pump system into a plurality of control streams. Each control streams is delivered to a respective pressure-responsive sub-systems integrated within the gearbox at operation 304. For example, a first control stream may be output from the flow divider to a clutch control system, while a second control stream may be simultaneously output from the flow divider to an actuation system. At operation 306, one or more pressure-responsive components included in the pressure-responsive sub-systems are controlled according to the respective control stream, and the method ends. For example, the first control stream may control a hydraulic clutch included in the clutch control system, while the second control stream may control the operation of a hydraulic actuator included in the actuation system. Accordingly, a gearbox hydraulic system may be provided, which includes multiple hydraulic sub-systems integrated within the gearbox.

While various embodiments have been described in detail, it should be readily understood that the inventive concept is not limited to such disclosed embodiments. Rather, the embodiments may be modified to incorporate any number of variations, alterations, substitutions or equivalent arrangements not heretofore described, but which are commensurate with the spirit and scope of the inventive concept. Additionally, while the various embodiments have been described, it is to be understood that features may be included only some of the described embodiments. Accordingly, the embodiments are not to be seen as limited by the foregoing description.

What is claimed is:

1. A gearbox system, comprising:
a gearbox having integrated therein a pump system, a plurality of fluid passages and a clutch control system, the pump system in fluid communication with the clutch control system via the fluid passages such that the pump system flows at least one pressurized stream to control a first pressure-responsive device included in the clutch control system, and a flow divider integrated therein to receive the at least one pressurized stream and to divide the at least one pressurized stream into a plurality of control streams wherein the plurality of control streams includes a first control stream output to the clutch control system and a second control stream output to a hydro-mechanical control unit (HMCU); and
wherein the hydro-mechanical control unit (HMCU) is in fluid communication with the gearbox to receive the at least one pressurized stream and to generate at least one actuator control stream.

2. The gearbox system of claim 1, wherein the clutch control system comprises:
a hydraulic clutch selectively operable in an engaged position and a disengaged position based on fluid pressure;
a manifold that selectively outputs the first control stream to the hydraulic clutch; and
an electro-hydraulic servo valve (EHSV) that receives an electrical control signal and that controls the manifold to output the first control stream based on the electrical control signal, the hydraulic clutch induced to the engaged position in response to receiving the first control stream and induced to the disengaged position when the lacking the first control stream.

3. The gearbox system of claim 2, wherein the gearbox further comprises an actuation system integrated therein, the actuation system being in fluid communication with the HMCU to receive the at least one actuator control stream.

4. The gearbox system of claim 3, wherein the actuation system includes a second pressure-responsive device that operates based on fluid pressure from the at least one actuator control stream.

5. The gearbox system of claim 4, wherein the second pressure-responsive device is a pitch actuator to control movement of a propeller blade unit.

6. The gearbox system of claim 4, wherein the HMCU comprises:
a servo valve that selectively outputs the at least one actuator control stream in response to an actuator control signal; and
a second EHSV that receives an electrical controller signal and that generates the actuator control signal to control output of the at least one actuator control stream.

7. The gearbox system of claim 6, wherein the gearbox includes a lubrication and cooling system integrated therein, the lubrication and cooling system configured to cool and lubricate a gear and bearing system of the gearbox based on a third control stream generated by the flow divider.

8. A gearbox, comprising:
a housing surrounding a gear system of the gearbox;
a first fluid pressure-responsive system disposed within the housing;
a second fluid pressure-responsive system disposed within the housing;
a pump system disposed within the housing, the pump system flowing a solid pressurized fluid through a plurality of fluid passages disposed within the housing;
wherein the gearbox comprises a flow divider disposed within the housing to divide the solid pressurized fluid into a first control stream output to the first fluid pressure-responsive system and a second control stream output to the second fluid pressure-responsive system; and
wherein the first fluid pressure-responsive system is a clutch control system comprising:

a hydraulic clutch that is selectively operable in an engaged position and a disengaged position based on fluid pressure;

a manifold that selectively outputs the first control stream to the hydraulic clutch; and an electro-hydraulic servo valve (EHSV) that receives an electrical control signal and that controls the manifold to output the first control stream based on the electrical control signal, the hydraulic clutch induced to the engaged position in response to receiving the first control stream and induced to the disengaged position when the lacking the first control stream.

9. The gearbox of claim 8, wherein the second pressure-response system is an actuation system that controls operation of a hydraulic actuator based on the second control stream.

10. The gearbox of claim 9, further comprising a lubrication and cooling system disposed within the housing, the lubrication and cooling system configured to cool and lubricate the gear system based on a third control stream generated by the flow divider.

11. The gearbox of claim 10, wherein the pump system comprises:

a reservoir to contain solid fluid; and a positive displacement pump that is driven by rotational power generated by rotation of an input shaft, the positive displacement pump in fluid communication with the reservoir to output the pressurized solid fluid to the flow divider.

12. A pressure-system integrated gearbox, comprising:

a plurality of pressure-responsive systems integrated in the gearbox wherein the plurality of pressure responsive systems includes a clutch control system, a lubrication system, and an actuation system;

a pump system integrated in the gearbox, the pump system configured to flow a solid pressurized fluid through a plurality of fluid passages integrated in the gearbox; and a flow divider integrated in the gearbox and disposed in fluid communication with the pump system, the flow divider configured to divide the solid pressurized fluid into a plurality of controls streams, each control stream being output to a respective pressure-responsive system among the plurality of pressure-responsive systems, wherein the plurality of a control streams include a first control stream output to the clutch control system to control a hydraulic clutch, a second control stream different from the first control stream that is output to the lubrication system to lubricate a gear system, and a third control stream different from the first and second control streams that is output to the actuation system to control a hydraulic actuator.

* * * * *